Dec. 16, 1969 P. A. TANNER, JR 3,483,687
CITRUS FRUIT HARVESTER
Filed Nov. 9, 1966 3 Sheets-Sheet 1

INVENTOR.
PAUL A. TANNER, JR
BY
Cushman, Darby & Cushman
ATTORNEYS

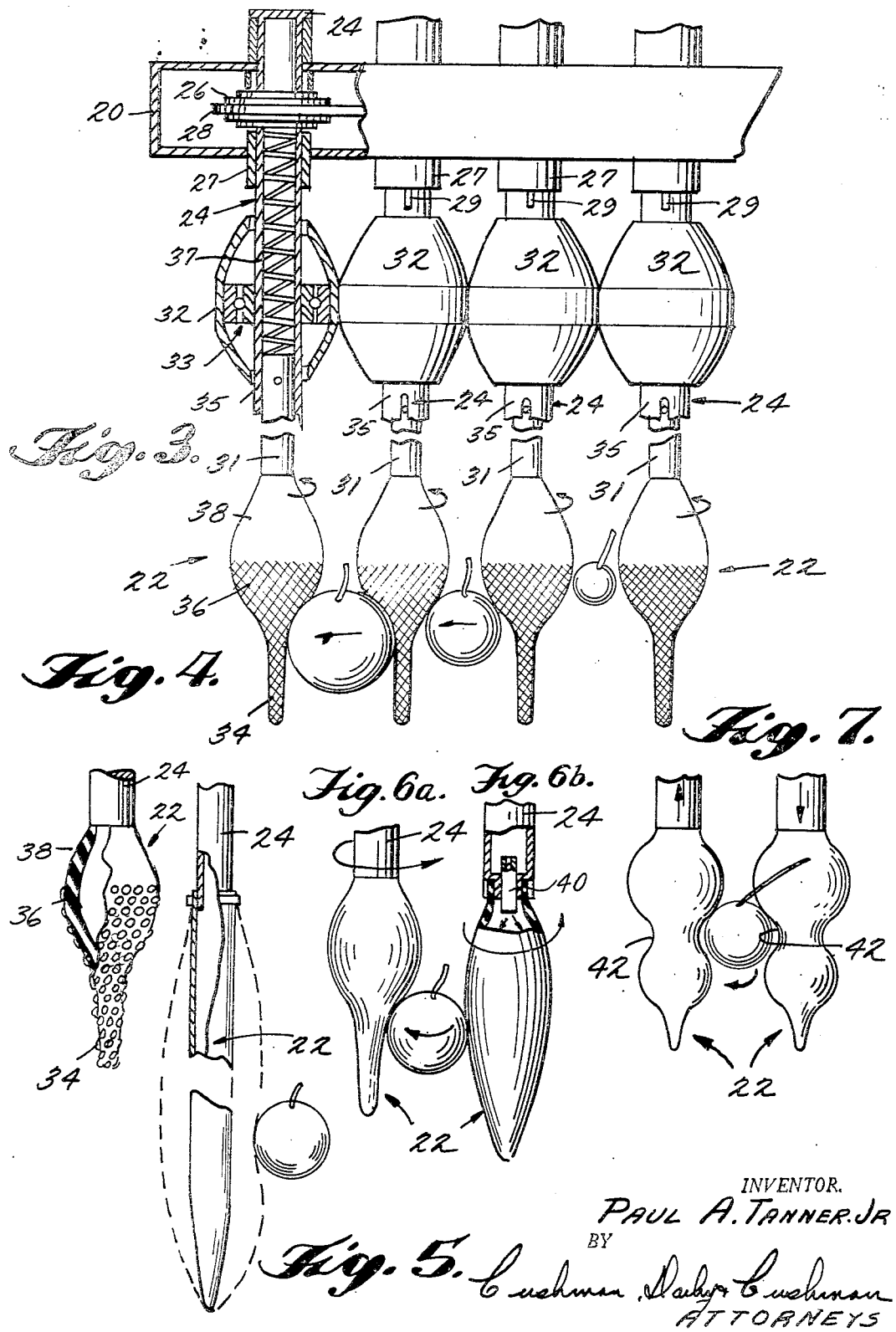

Dec. 16, 1969  P. A. TANNER, JR  3,483,687
CITRUS FRUIT HARVESTER
Filed Nov. 9, 1966  3 Sheets-Sheet 3

INVENTOR.
PAUL A. TANNER, JR.
BY
Cushman, Darby & Cushman
ATTORNEYS

United States Patent Office 3,483,687
Patented Dec. 16, 1969

3,483,687
CITRUS FRUIT HARVESTER
Paul A. Tanner, Jr., P.O. Box 1127,
Auburndale, Fla. 33823
Filed Nov. 9, 1966, Ser. No. 593,076
Int. Cl. A01g 19/08
U.S. Cl. 56—328                    17 Claims

ABSTRACT OF THE DISCLOSURE

The method of the invention includes the steps of contacting and engaging only ripe fruit on an upper surface of the fruit for twisting and pushing the fruit off from its stems. The apparatus of the invention comprises a plurality of spindle heads and means for rotating all heads in a common rotational direction. The apparatus is constructed to normally cause four spindle heads to contact an individual fruit on its upper surface so as to twist the individual fruit two or three times about its stem axis while a gentle pushing force is being applied to the upper surface. The spindle heads are constructed and spaced from one another to selectively remove only ripe fruit from a tree, and the spindle heads include constructional features for frictionally engaging fruit and for permitting an easy entry and removal of a plurality of heads into a tree.

The present invention is directed to a fruit harvesting method and apparatus and is particularly concernd with the harvesting of citrus fruit.

In present day practice citrus fruit is picked or removed from trees substantially entirely by hand labor, although there have been several attempts to develop and utilize mechanical devices for picking fruit. Hand labor for fruit harvesting is becoming increasingly costly because of increased wage costs and also because of nonavailability of such labor during the ripe fruit seasons, and therefore, it has become necessary to consider mechanical devices for fruit harvesting. A number of prior attempts have been made to remove fruit from trees with machines and other mechanical devices, but none of the prior developments known at this time have been successful in gently removing only ripe citrus fruit from trees and without causing damage to the fruit or to the tree itself. Approximately one-half of present day citrus plantings consists of fruit varieties which produce two separate crops, and therefore prior methods and devices which operate to cause a mass removal of fruit are unsatisfactory for citrus fruit harvesting. Such prior developments have included devices which embrace tree limbs for shaking fruit therefrom; devices for blowing pulsating air streams against trees in an attempt to knock off ripe fruit; picking devices which have either grappled the fruit for pulling it from a tree or which have driven shafts into a tree to strike the fruit loose by paddles carried on the shafts; and devices which act as combing devices for movement upwardly into a tree and outwardly therefrom to pull fruit off from the branches. Although a number of mechanical pickers of the type described above have been actually used experimentally, none have been accepted by the citrus fruit industry because the crop cannot yet be selectively picked quickly and handled properly without substantial damage to the fruit and to trees when such devices are used. It is important in the present day citrus industry to selectively harvest a fruit crop, and the present invention provides for such selectivity in harvesting.

The present invention represents a substantial improvement over prior attempts inasmuch as citrus fruit is more carefully handled, more completely removed from a tree, and removal is accomplished quickly, with little or no damage to the tree. Further, the harvesting improvement of this invention selectively removes large mature fruit, while leaving small immature fruit on the tree. With the apparatus and method of this invention, fruit is not grappled and pulled from a tree as has been attempted with many prior art devices. It has been found that a grappling or pulling type of removal operation requires ten to twenty-five pounds of pulling force on an individual citrus fruit, and a pulling force in this range results in damage to the fruit or to the tree branch on which it is growing when the fruit is torn loose. In some instances the fruit stem pulls off a substantial portion of the tree branch to which it is attached, and at other times the fruit stem is torn out of the individual fruit along with a segment of the fruit peel. When a branch segment or a long stem is left attached to a fruit there is a danger of puncturing other fruit when the crop is collected in receptacles; and of course, it is not desired to damage either fruit or trees in a process of harvesting.

The present invention contemplates a novel method for removing fruit wherein an individual fruit is gently twisted about its stem axis and at the same time is gently pushed away from the tree by a force acting on an upper surface of the individual fruit. Thus, the method is just the opposite from prior methods which have attempted to duplicate manual picking and grappling of fruit by pulling the same from a tree branch. The novel method of this invention comprises the steps of approaching a tree from an upper portion, entering the tree for engaging the upper surface of individual fruit, and then twisting the fruit about its stem axis while applying a pushing force which serves to push the fruit off from its twisted stem. It has been found that very little force is required to push ripe fruit from a twisting stem, and accordingly there is little likelihood of damage to the fruit or to the branch upon which it is growing by the removal process. In practicing the invention, it is usually necessary to twist a fruit for less than three complete rotations to effect a gentle removal of the fruit without carrying along a portion of the fruit peel, or the stem or the branch to which it is attached.

The invention also provides for novel apparatus which can enter a tree; engage ripe fruit for twisting and pushing it off from its stem; and which can then leave the confines of the tree without causing damage to remaining fruit or to the tree during any part of the operation. The apparatus includes a platform or frame having a plurality of specially formed spindle heads which can cooperate with one another to twist only ripe fruit while at the same time applying a gentle pushing force to the upper surfaces of the ripe fruit. The spindle heads are carried at the ends of relatively long spindle shafts which are mounted in the platform or frame for rotation in a common direction so that engagement of our spindle heads with an individual fruit will cause the fruit to be quickly and easily twisted about its stem. The platform or frame of spindles is adapted to be carried at the end of an adjustable boom means, and the boom means may be mounted on a vehicle which can be moved adjacent to citrus fruit trees. Control means may be provided for operating the boom and for placing the platform and its spindle heads into positions for approaching trees from an upper side of the tree so that the spindle heads can be inserted downwardly into the tree to contact clusters of fruit for twisting and pushing ripe fruit to remove it from the clusters.

The spindle head means which form a part of the present invention are constructed to provide for an easy entry into and exit out of a citrus fruit tree so that the spindle heads can be operated to remove fruit without any damage to the tree. In a preferred form of the invention, each spindle head is constructed to include a relatively narrow tip portion which assists in guiding the spindle head into a tree to bring the initial movements of the entire platform of spindles into fruit engaging contact within the tree. Further, the spindle head means has a relatively large diameter body which acts to frictionally engage the upper surfaces of ripe fruit, and adjoining spindle head means cooperate with one another to apply a pushing and twisting force to an individual ripe fruit which is engaged therebetween. Finally, the preferred spindle head construction includes an upper portion for guiding the spindle head means out of a tree after fruit has been removed from the tree. The entire spindle head means may be somewhat in the shape of an inverted pear, and the main body portion of the spindle head means may include a concave type of surface which is especially adapted for receiving the spherical surfaces of fruit to be removed from the tree. The lower tip portion and the main body portion which contact fruit may have surfaces which are formed to create a greater frictional contact with the fruit. For example, the lower fruit engaging portions of the spindle head means may be formed from a somewhat resilient material, such as rubber, which has a roughened surface or even a great number of small suction formations or other projections on the surface for providing a greater frictional contact of the spindle head means with fruit. On the other hand, the upper portion of the spindle head means has a relatively smooth surface in order to assure an easy removal of the spindle head means from a tree after a fruit harvesting operation has been completed. Individual spindle head means are mounted on individual shafts of relatively long length (for example, six to twelve feet in length), and the long shafts provide for a transmission of rotational driving forces to the individual spindle head means. The long shafts are preferably constructed to be telescoping, with telescoping sections which are spring loaded, so that an individual shaft may be telescoped when a spindle head carried thereon encounters an unyielding portion of a tree, such as a limb.

A number of modifications for the spindle head means will be discussed with reference to the present invention. Such modifications include spindle head means which can be inflated to contact fruit for twisting the same about its stem, and the inflatable means may be of a configuration to permit the simultaneous contacting of several layers or clusters of fruit from the top to the bottom of a tree. Also, this invention provides for additional means which may cooperate with the spindle head means to assist in the removal of the fruit from its stem. Such means may include a wiper or blade device which swings outwardly from an individual spindle head means to strike a fruit stem as it is being twisted. Further embodiments of the invention will discuss means for flexing the spindle head shafts relative to one another and to a tree.

Altogether, the invention provides for a method and apparatus which reliably and gently removes ripe citrus fruit from trees, leaving only smaller fruit of a later second crop on the tree. The removal is effected without damage to the crop or to the trees, and the entire harvesting operation can be effected at a reasonable cost to the present day citrus industry.

These and other advantages of the present invention will become apparent in the more detailed discussion which follows and in that discussion reference will be made to the accompanying drawings in which:

FIGURE 3 is an elevational view of a number of spindle head means mounted on individual shafts and carried by a platform or frame, the shafts being illustrated as including spacer devices for preventing the contact of adjoining spindle head means if the shafts are deflected within the confines of a tree;

FIGURE 4 is an elevational view of a preferred form of a spindle head means, showing a portion of the head cut away to illustrate detail;

FIGURE 5 is an elevational view of an individual spindle head means which can be inflated for a sufficient length to contact several layers of fruit within the confines of a tree;

FIGURE 6a is an elevational view of a spindle head means cooperating to twist an individual fruit, and the spindle head illustrated includes an inflatable head portion;

FIGURE 6b is an elevational view of a spindle head means which includes an inflatable head portion and which has a different outer configuration from that shown in FIGURE 6a;

FIGURE 7 is an elevational view of two modified spindle head means, each of which include a modified configuration to contact more of the surface area of an individual fruit held therebetween for twisting;

Figure 1:
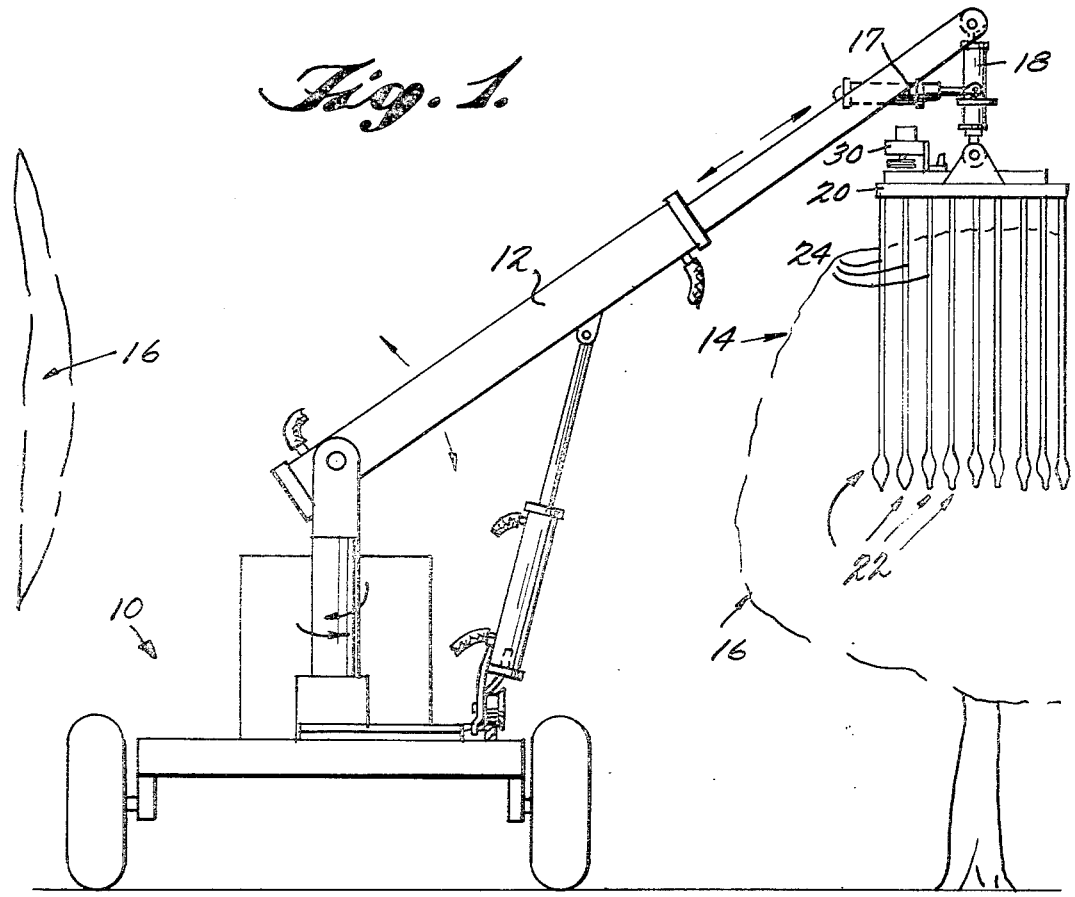
FIGURE 1 illustrates an elevational view of the harvesting unit of this invention as included on a typical vehicle structure which may be driven adjacent to fruit trees in a grove.

Referring to FIGURE 1 the harvesting apparatus of this invention is shown as including a vehicle 10 which may be moved adjacent to trees in a fruit grove. The vehicle typically includes a boom 12 which can be extended and moved relative to the vehicle for carrying a harvesting unit 14 into a proper position for harvesting a crop from a citrus tree 16. The particular construction of a vehicle or boom is not a part of the present invention, and any well known type of vehicle with a boom means may be utilized. Typically, the boom includes control means for manipulating the boom position relative to an adjacent tree, and also control means for extending and retracting the boom and for rotating it relative to the vehicle. Additionally, it is desirable to include a means for rotating or twisting the harvesting unit 14 relative to the end of the boom. The illustrated boom construction includes a hydraulic ram 17 which functions to rotate or twist the harvesting unit 14 about a vertical axis. Further, the boom includes a hydraulic means 18 (which may be a telescoping piston and cylinder construction) for moving the unit 14 up and down a vertical axis for movement into and out of a tree. It will be appreciated that the illustrated vehicle is shown as example only, and any equivalent vehicle may be utilized with the harvesting unit 14 of this invention. Thus, there is provided a means for moving the haresting unit 14 into working positions relative to fruit trees, and the vehicle and boom construction can be propelled from place to place to operate on one tree after another, as required. The present invention is concerned with the particular construction of the harvesting unit 14, and with an improved method of removing only ripe citrus fruit from trees.

As is apparent in FIGURE 1, the harvesting unit includes a platform or frame means 20 from which a plurality of spindle head means 22 depend. The spindle head means are mounted in spaced positions from one another (as will be discussed in greater detail below), and each spindle head means 22 is rigidly mounted on a relatively long shaft 24. In a preferred construction the spindle shafts 24 are sufficiently rigid to prevent any flexing of individual spindle heads out of their normal positions. Also, the shafts 24 are preferably made up of two or more telescoping sections which can be compressed, one into another, against the action of springs or hydraulic fluid pressure. By providing for a telescoping compression of individual shafts 24, it is possible for a single shaft and the spindle head carried thereon to be arrested in their downward movement through a tree when a predetermined resistance is encountered (such as might be caused by a tree limb) without retarding the downward movement of remaining shafts and spindle heads which do not encounter any obstructions. The spindle shafts 24 may be formed from hollow tubular stock material or they may be alternatively formed from solid rods. However, if the shafts are made from single rods so as to be non-telescoping, it is preferred that the shafts be of a sufficient length and diameter to provide for a slight flexing of the individual spindle head means 22 out of their normal positions. In this way, the spindle head means can be deflected in a movement downwardly into a citrus fruit tree, and there is less likelihood of damaging the spindle heads or any part of the tree by the downward movement of the entire platform and all of the spindles carried thereon.

The platform 20 may include as many rows of spindle head means 22 as desired, and a typical construction may include ten to twenty rows of spindle head means in right angular directions of a horizontal plane so as to make up a relatively large platform of long spindle shafts, having individual spindle heads mounted at their terminal ends. When the platform and the remainder of the harvesting unit are constructed as shown in FIGURE 1, the spindle head means are all positioned at a common horizontal planar level relative to one another. This is not a necessary placement of the spindle head means, but provides for a ready action of any four adjoining spindle heads upon an individual fruit which is engaged therebetween. Each of the spindle shafts 24, and the heads included thereon, are mounted in the platform 20 to be rotated in a common rotational direction so that a fruit caught therebetween will be twisted about its stem axis. Since the present invention is departing from prior practices of reaching up and grappling an individual fruit for pulling the same from a stem or branch, it is important that the harvesting unit 14 can be positioned above a tree for movement downwardly into the tree. This type of placement is shown in FIGURE 1 wherein the harvesting unit has already descended into the confines of the citrus fruit tree 16.

The spindle head means 22 of FIGURE 1 are spaced from one another so as to engage only fruit which is ripe and of a proper size for harvesting. Thus, if the fruit crop is an orange crop, it is necessary that the diagonal distances between any four adjacent spindle head means (when viewed as in FIGURE 10) be less than the expected diameter of a full grown, ripe orange but greater than the expected diameter of an immature orange, thereby allowing small, unripe fruit to pass through. Likewise, if the fruit crop is a grapefruit crop, the spacing of individual spindle head means would contemplate distances which are less than the full diameter of a ripe grapefruit but more than the diameter of an unripe grapefruit. Since the individual spindle head means are spaced closely enough to engage ripe fruits between any four adjacent individual heads, it is apparent that nearly all of the ripe fruit crop which is contacted by a downward movement of the harvesting unit 14 will be engaged for a removal from the tree. The removal of fruit is accomplished by a novel method of twisting the fruit about its stem while at the same time applying a slight downward pressure upon an upper surface portion of the fruit. It has been found that a twisting of an individual fruit about its stem axis causes a gentle and easy removal of the fruit from its stem without tearing any part of the fruit and without carrying along a stem or branch portion with the removed fruit. This type of removal is desirable since it avoids damage to the crop and to the tree from which the crop is being removed.

Figure 2:
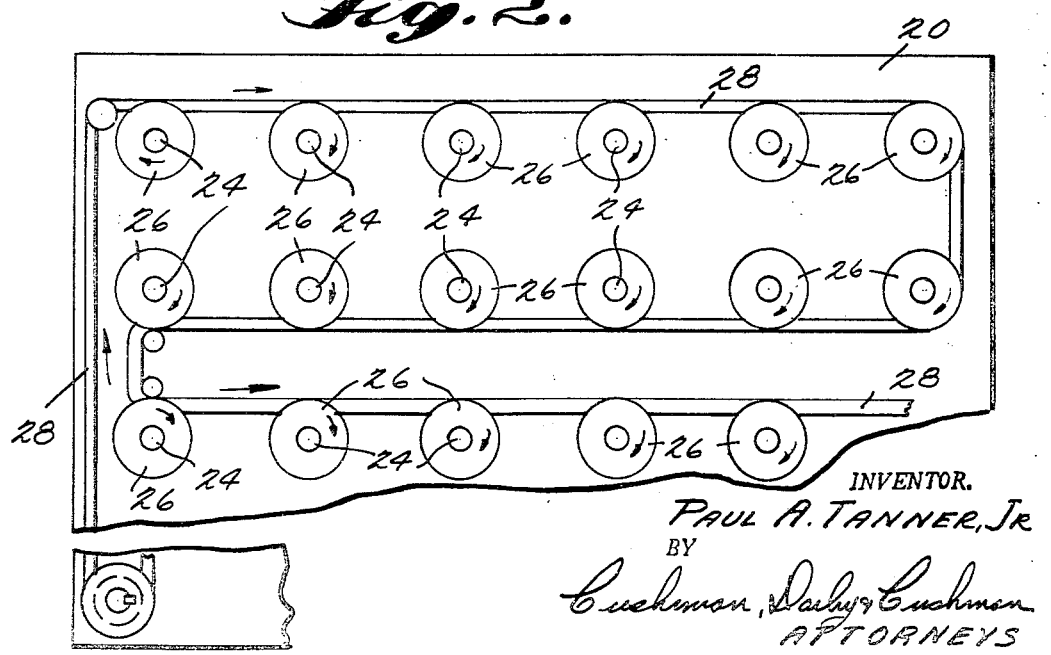
FIGURE 2 represents a top plan view of a driving means associated with the harvesting unit for driving individual spindle head means in a common rotational direction.

The twisting and pushing movements which are a part of the method of removal are provided by a particular driving arrangement for individual spindles of the complete platform of all spindles. The individual spindles are driven to be rotated in a common rotational direction, as illustrated in FIGURES 2 and 3, and this results in a twisting motion being applied to any fruit which is engaged between adjoining spindle head means. The FIGURE 2 illustration shows a top plan view into the platform or frame means 20, and the individual spindle shafts 24 are illustrated as passing upwardly through the platform or frame. Each of the shafts 24 may carry a pulley means 26 at its upper end, and the shaft may be mounted in bearings or by any other suitable arrangement within the framework of the platform 20. Although it is within the abilities of those skilled in the art to provide for suitable mountings for the plurality of shafts 24, FIGURE 3 shows a typical mounting arrangement wherein each shaft 24 passes through a bearing sleeve 27 which is rigidly affixed to the platform 20. The shafts 24 may extend all the way through the platform 20 when it is desired to provide for a vertical movement of the shafts relative to the platform; or the shafts 24 may terminate within the platform for being rotated only and without any additional movements being applied thereto. The embodiment of FIGURE 3 illustrates the shafts 24 as extending through the platform, but detail has been omitted with respect to a means for moving the shafts vertically relative to the platform. Each of the illustrated shafts 24 carries a pulley or sheave 26 for rotating the shaft, and each pulley 26 may be keyed to its respective shaft for rotating the same. Elongated keyways 29 are illustrated in FIGURE 3 to accommodate vertical movements of the shafts within the pulleys, but such keyways may be omitted where no vertical movement is required. An endless belt means 28 is provided for contacting all of the separate pulleys 26 associated with the separate spindle shafts. By arranging the endless belt 28 along a particular path of movement, as illustrated, all of the pulleys can be made to rotate in a common direction (as shown by the arrows, for example). A motor means, such as an electric motor 30, can be carried on the platform 20 for driving one of the pulleys 26 or the endless belt 28. Of course, it is understood that the endless belt should engage each of the pulleys so as to frictionally cause a rotation thereof, and the endless belt may be provided with a specially formed gripping surface to assure such rotation. Alternatively, sprocket members may be substituted for the pulleys, and an endless chain may be used in place of the belt 28 for driving the spindle shafts and their associated spindle heads 22. It can be seen that a movement of the endless belt 28 causes a rotational movement of each pulley 26 which is keyed to turn its associated shaft 24. At the lower terminal ends of the shafts 24, the individual spindle head means 22 are suitably mounted to rotate therewith.

FIGURE 3 also illustrates a typical operation of the harvesting unit of this invention when varying diameters of fruit are encountered by adjoining spindle head means. In the FIGURES 3 illustration, it is to be understood that each fruit which is engaged by adjoining spindle heads is actually engaged by four separate spindle heads arranged in the horizontal pattern shown for FIGURE 10, and two of the four spindle heads in each fruit engaging instance have been omitted from the FIGURE 3 drawing for clarity. Beginning at the left side of the illustration, it can be seen that two mature and ripe citrus fruits are separately engaged between two separate sets of spindle heads, and the fruits are engaged in such a way that rotational movements of the spindle heads will cause a twisting of each of the fruits about its stem axis. The right hand side of the illustration shows an immature and unripe individual fruit passing between two adjoining spindle heads, however, it is to be understood that the unripe fruit could be of a larger diameter than that shown and still pass between four spindle heads which are arranged as in FIGURE 10. It is a particular feature of the present invention that the harvesting unit can select between a ripe and unripe crop for harvesting only the ripe portion of the crop.

It is preferred that the spindle shafts 24 be of a relatively long length, such as six to twelve feet in length, and because of the rather long length of the individual shafts 24 it is preferred to provide for a telescoping construction of each separate shaft. The shafts 24 can be constructed from separate segments (two or more) which may telescope one within another, and a typical assembly is illustrated in the left hand spindle shaft of FIGURE 3. In the illustrated example, the shaft 24 includes at least one smaller diameter segment 31 which may telescope within a larger diameter shaft segment 35. The segments are keyed together in any well known manner to prevent relative rotation therebetween, and further, a spring means 37 or its equivalent, is provided to maintain the segments 31 and 35 in normally extended positions.

The purpose in providing a spring means is to permit a compressing of one segment into the other when a predetermined resistance is encountered by a spindle head means carried at the end of the spindle shaft. The resistance which is contemplated by this invention is the type of resistance which would be encountered if a spindle head should strike a limb or other obstacle within a tree, and when such a resistance is met, it is desirable to stop any further downward movement of that particular spindle head, while at the same time permitting a continued downward movement of adjoining spindle heads. Thus, the spring means 37 is of such a strength that the entire spindle shaft 24 is maintained in an extended position until the predetermined resistance is met. A hydraulic compression system or other equivalent means may be used as a substitute for the spring means 37.

FIGURE 3 illustration is to be understood as an example of relationships between spindle heads and fruit and the precise dimensions are not to be taken literally as would be the case with technical drawings.

In order to prevent the possibility of adjacent spindle heads 22 from contacting one another while they are rotating (and thereby abrading or otherwise damaging one another), spacer elements 32 may be mounted on upper portions of the shafts 24 to prevent an actual contact of the spindle head means 22. Although the spacer elements 32 are illustrated at relatively high positions along the shafts 24, it is to be understood that the spacers would be placed wherever necessary to prevent an actual contact of the spindle heads. Also, the spacer elements 32 are shaped to permit an easy entry and exit of the spindles into and out of a tree, and the shape shown in FIGURE 3 is only an example of a typical construction. The spacers 32 are preferably mounted on shafts 24 by means of bearing element 33 so that the spacer elements will not be rotated by the rotating shafts. An alternative construction for the illustrated spacers would include a platform or frame of interconnected stabilizers or spacers which would be positioned below the main platform 20 of the unit. The stabilizer platform could be interconnected to the main platform by telescoping jacks which would function to move the main platform toward or away from the stabilizer platform. With such an arrangement, the stabilizer platform could be placed on the outer surface of a tree and the spindle shafts could be moved through the stabilizer and into the tree by moving the main platform downward toward the stabilizer platform while maintaining the stabilizer platform in a fixed position relative to the tree.

The spindle head means 22 may be of any shape or configuration, but it has been found that a preferred configuration results in an improved performance of the apparatus of this invention. In a preferred construction, the spindle heads are constructed as shown in FIGURE 3 to include a lowermost tip portion 34 which is relatively small in diameter and pointed enough to permit an easy entry of the spindle head into a tree. The individual spindle head means 22 also includes a main body portion 36 which comprises the largest diameter portion of the spindle head means and which includes a surface for frictionally engaging and twisting an individual fruit. Finally, the spindle head means 22 includes an upper portion 38 which is shaped to provide for an easy removal of the harvesting unit from a tree and without damage to the unit or the tree itself. The lower tip portion 34 and the main body portion 36 may include a special surface formation which provides for a better frictional contact of those portions with an individual fruit. This surface formation has been illustrated in FIGURE 3 by hatch lines which indicate a roughening of the surfaces at the indicated places. However, an equivalent type of surface formation may be used, and it has been found that individual suction elements, or any other form of projections, may be molded or formed on the surface of the spindle head means (as shown in FIGURE 4) for providing the requisite frictional contact of the head with a citrus fruit surface. The upper portion 38 of the spindle head means is formed to be relatively smooth so as to assist in an easy removal of the harvesting unit 14 from the confines of a tree. Thus, there is provided an arrangement wherein a relatively large number of fruit engaging spindle head means may be moved downwardly into a tree for contacting fruit and for removing the same without causing any damage to the tree or to the unit. The tip portions 34 find their way past branches, and as ripe fruit is engaged between adjoining rotating spindle heads, there is a quick removal of the fruit from the tree. The entire harvesting unit is slowly moved downwardly into the tree so as to apply a slight downward force on the upper surfaces of fruit engaged between adjoining spindles, and in this way, the fruit is quickly twisted and gently pushed off from its stems without removing any part of the stem or branch of the tree and without damaging the fruit. The operation continues by a continued downward movement of the harvesting unit 14, and as individual fruit is engaged between cooperating spindles, it is quickly removed and the entire unit can progress in its downward path. It should be understood that an individual fruit is normally engaged between four adjoining spindle heads 22 since the spacing between adjoining spindle heads is selected to contact a single fruit between four adjoining spindle heads. Also, it can be seen that varying diameters of ripe fruit are contacted at varying levels of adjoining spindle heads, and in this way the spindle heads of this invention remove all of a ripe fruit crop.

FIGURE 4 illustrates detail of a typical spindle head means 22 which may be used with this invention. The spindle head is formed, as by molding, from a resilient rubber-like material which will not abrade or damage citrus fruit, and the head may be hollow to permit further esilience when the head contacts a very large fruit or a tree branch. The outer surface of the spindle head may include suction devices on the portions 34 and 36, and of course any other equivalent surface formation may be utilized. When the spindle head means is manufactured from a rubber-like material, the narrow tip portion 34 is sufficiently flexible to permit an easy entry of the head into a tree and past branches without causing any damage to the tree.

FIGURES 5 through 7 illustrate alternative constructions for the spindle head means of this invention, and these constructions may be used as alternative devices to the type of spindle head means shown in FIGURES 3 and 4. FIGURE 5 illustrates a type of spindle head means 12 which includes a relatively long inflatable body portion. The body portion is formed from an inflatable material, such as rubber, and is constructed to inflate upon the admission of a fluid into its interior. Fluid, such as compressed air or other gas, may be admitted into the interior of the body through any suitable conduit means, and it has been found that the fluid can be easily admitted through a hollow spindle shaft 24 upon which the spindle head means is mounted. The spindle body of the FIGURE 5 embodiment is relatively long compared to the spindle head means discussed for FIGURES 3 and 4, and a typical construction may include a main body which is several feet in length and which can be inflated throughout its length for contacting several layers or clusters of fruit throughout the depth of a tree. Preferably, the spindle head means of FIGURE 5 also includes means for deflating the head so that when a plurality of such spindle heads are introduced into a tree they can be deflated and easily moved downwardly into the confines of a tree without resisting such movement. Upon reaching a requisite depth for removing fruit, the plurality of spindle head means can then be inflated to embrace and engage individual fruit located along the positions of the spindle heads 22. Although only one fruit is shown as being contacted by the dotted line position of the inflated body 22, it will be understood that the spindle head means is long enough to contact several layers of fruit. The spindle head means of FIGURE 5 is rotated by a suitable driving means, such as described for FIGURE 3, and thus, there is a provision for spinning or twisting friut about its stem axis. Adjoining spindle heads of the type shown for FIGURE 5 can contact a number of individual fruits and can twist such contacted fruit so as to remove the same from their stems. Also, the plurality of spindle head means can be slowly moved downwardly into the tree (as discussed for FIGURE 3) and in this way there is provided the requisite downward force on the individual fruits which assists in the removal of the fruit from their stems. The spindle head means of FIGURE 5 may further include an inner support element, such as a rod which extends downwardly to the tip of the spindle head, to provide support for the head when it is deflated for movement into a tree.

FIGURES 6a and 6b illustrate an additional type of inflatable spindle head means, and in this case the spindle head means is of a size which is approximately the same as the size of spindle head means described for FIGURES 3 and 4. The inflatable spindle head means of FIGURES 6a and 6b may have a configuration as shown in the spindle head of FIGURE 6a or alternatively, the spindle heads may have a general configuration as shown in the embodiment shown in FIGURE 6b. In either case, compressed air, or other gas, is introduced into the spindle head means 22 by a conduit 40 which is received into an upper end of the individual spindle head means. The spindle means may be constructed from rubber or other resilient material which is sufficiently flexible to be inflated to a desired configuration. As with the FIGURE 4 embodiment, the spindle head means of FIGURES 6a and 6b can cooperate to contact and twist an individual fruit about its stem axis so as to cause a removal of the fruit upon application of a slight downward pressure.

FIGURE 7 illustrates a further embodiment for constructing spindle head means in accordance with this invention. In the FIGURE 7 construction, an additional receiving area 42 is provided for engaging an individual fruit between adjoining spindle head means. The fruit engaging area 42 is of such a configuration to contact much of the surface of an individual fruit and to thereby apply rotational forces to a substantial portion of the fruit's surface. As indicated by the arrows on the spindle shafts 24 of the FIGURE 7 embodiment, adjoining spindle head means may be moved along their longitudinal axes relative to one another so as to give a further twist to an individual fruit about an axis which is at right angles to the stem axis. A mechanism for causing the longitudinal movements of adjoining spindles will be discussed with reference to FIGURE 10, but it can be seen that this type of additional twisting movement further assists in the removal of a fruit from its stem. An arrow at the base of the illustrated fruit in FIGURE 7 indicates the direction of additional rotational movement applied to that fruit by the longitudinal movements which are indicated for the pair of adjoining spindle head means.

Figure 8:
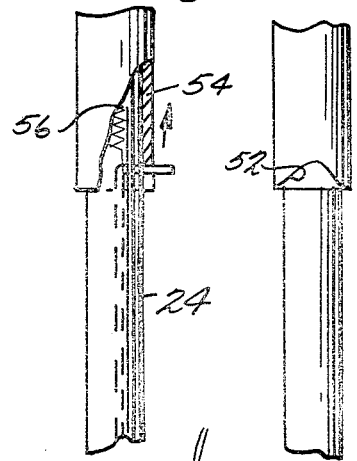
FIGURE 8 is an elevational view of a pair of spindle heads mounted on separate shafts and including a device for assisting in the removal of a stem from a fruit being twisted between the pair of spindle heads.

FIGURE 8 illustrates a wiper or blade means 50 which may be included with some of the spindle head constructions of this invention for assisting in the removal of fruit from its stems. The wiper or blade means 50 can be in the form of a metal finger device which may or may not have a sharpened edge for contacting the stem of a fruit. The wiper means 50 is carried within a portion of the spindle head means 22 and its spindle shaft 24 so as to be remotely actuated by a cam means or other devices carried in the platform 20. In the FIGURE 8 illustration, the wiper means 50 is shown as including a relatively long main body portion which extends to an uppermost part of the shaft 24 so as to be actuated by a cam surface 52 carried by the separate sleeve 54. The cam surface of the sleeve is designed to be rotated periodically to move the blade 50 downwardly and outwardly from the main body of the spindle head means so as to strike a fruit stem carried between adjoining spindle heads. By this arrangement, the wiper means can be made to contact and assist in the removal of a stem from a fruit. It is not required that the wiper means include a sharpened edge, and in fact, it is preferred that the wiper means be dull enough to strike a stem so as to remove all of the stem from a fruit without leaving a portion of the stem attached to the removed fruit. A spring means 56 may be included within the spindle shaft construction to normally return the wiper means 50 to an interior position within the spindle head means. Accordingly, the wiper means is actuated and moved outwardly from the spindle head means only when periodically pushed into such a position by the cam 52. The separate sleeve 54 may be rotated by any suitable driving means for separately turning the sleeve 54, and the driving of the plurality of sleeve 54 associated with the plurality of spindle shafts of a platform may be programmed to cause outward movements of separate wiper means 50 in accordance with a predetermined schedule.

Figure 9:
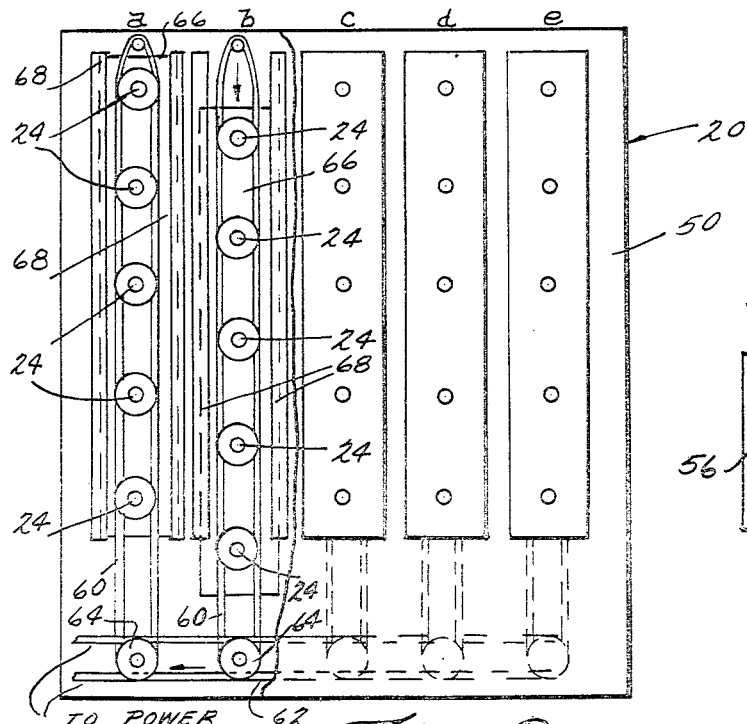
FIGURE 9 is a top plan view of an arrangement for adjusting the spaced positions of adjoining spindle heads and the shafts to which they are connected.
Figure 10:
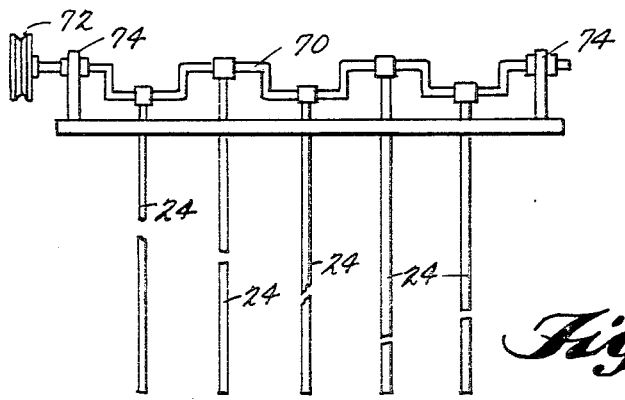
FIGURE 10 is a top plan view of four adjoining spindle heads contacting an individual ripe fruit.
Figure 11:
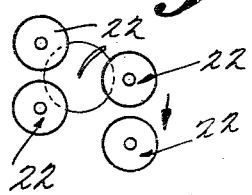
FIGURE 11 is a top plan view, similar to the view of FIGURE 10, but showing the adjoining rows of spindle heads staggered to adjust their spacing, as discussed for the apparatus of FIGURE 9.

FIGURE 9 is a top plan view of a platform construction having a means for adjusting the spacing of adjoining spindle heads carried at the lower ends of a plurality of spindle shafts 24. As previously stated, the spindle heads accommodate varying sizes of ripe fruit by the novel configuration which has been shown, however, further adjustment of the apparatus can be made by the variation shown in FIGURE 9. Two rows, a and b, of spindle shafts 24, and the pulleys 26 associated therewith, are exposed in the platform 20 to illustrate a sliding plate and track arrangement for moving entire rows of spindles; and the remaining rows of spindle shafts and pulleys are concealed by an upper plate 58 covering the platform 20. In the embodiment of FIGURE 9, the individual spindle head means are driven by belt drives, similar to the type described for FIGURE 2, however, separate belts are provided for separate rows of spindles. Thus, the separate rows a–e of the platform are separately driven by the separate belts 60 associated with each of the rows. A main belt 62 indirectly contacts all of the separate rows so as to provide a driving force, and the main belt 62 receives its driving movement from the electric motor means 30 which is mounted on the platform 20. It can be seen that the main belt 62 can be driven in a given direction and that the direction of movement is relayed to the belts 60 of the separate rows *a–e*. Pulleys 64 which transmit the motion from the main belt 62 to the separate belts 60 may be double pulleys for receiving and driving the separate belts 60 and 62 in overlapping relationship. With the arrangement shown for FIGURE 9, any of the separate rows *a–e* can be separately moved relative to adjoining rows so as to change the positions of adjoining spindle heads carried at the ends of the shafts 24. When all of the rows are in normally aligned positions (such as is shown in the three rows *c–e*), the picking area between four adjoining spindle heads is greater than the picking area afforded by three spindle heads when alternate rows are staggered. FIGURES 10 and 11 illustrate the effect of staggering on picking area at the level of the spindle heads. The staggering of alternate rows is accomplished by sliding all of the spindle shafts, and spindle heads carried thereby, in a horizontal plane for any one row as compared to its adjoining rows. This adjustment feature is useful when the same harvesting unit is to be used for harvesting grapefruit crops and orange crops. The means for effecting the movement of alternate rows of spindles relative to remaining rows may include any conventional structure. However, the FIGURE 9 embodiment shows a typical arrangement wherein the separate rows *a–e* of spindle units are mounted on plates 66 which can be slid in horizontal planes along the tracks 68 provided on opposite edges of the respective plates. Any suitable driving means for pushing one plate along its pair of tracks 68 to a position such as is shown in row *b* may be utilized, and the details for causing such movement have been omitted from the drawing for clarity. It is contemplated that any suitable mechanism can be constructed within the platform 20 to cause the desired sliding movement of the respective plates *a–e* as desired.

Figure 12:
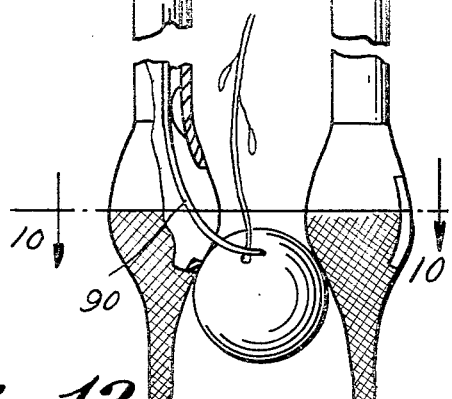
FIGURE 12 illustrates in elevational view a means for moving adjoining spindle head shafts relative to one another and along their longitudinal axes.
Figure 10:
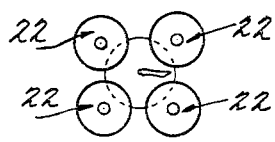

FIGURE 12 illustrates a typical mechanism for providing the type of relative movement of adjoining spindles which was discussed with reference to FIGURE 7. It will be recalled that adjoining spindles, of the FIGURE 7 arrangement, could be moved relative to one another along the longitudinal axes of the separate spindle shafts. The individual pulleys for rotating the separate spindle shafts have been omitted from the illustration of FIGURE 12 for clarity, but it is understood that the driving means for rotating each shaft separately would be included in the FIGURE 12 construction. The individual pulleys are mounted at the upper ends of the separate shafts 24 and would be keyed to permit longitudinal movements of the shafts up and down along their axes in accordance with the positions of the crank means 70. A separate driving pulley 72 may be provided at one end of the crank 70 for rotating the same in its journal 74. Of course, a separate motor or other driving means may be provided for rotating the pulley 72 by means of a conventional drive belt arrangement. With the system of FIGURE 12, it is possible to apply an additional twisting force to an individual fruit about an axis which is at right angles to the stem axis of the fruit. This force may be in addition to the twisting forces described above or it may be used only in combination with the downward force of all spindles through a tree. Having described the apparatus of this invention, it will be appreciated that many variations and modifications are possible, and all such equivalent changes in the structure are intended to be included within the scope of this invention. For example, it is contemplated that the individual shafts 24 for carrying the spindle head means may be adjustable along their lengths so that the platform 20 can be placed adjacent a top surface of a tree and then all of the plurality of shafts can be driven downwardly into the tree without further movement of the platform. Such an arrangement could include telescoping shafts which can be driven to extend and retract in any well known manner to provide for a relative movement of the spindle head means compared to the platform 20. Alternatively, the shafts 24 can extend upwardly through the platform 20 and separate driving means may be included for driving the shafts 24 downwardly into a tree and upwardly out of a tree relative to a stationary platform 20. Means for telescoping individual shafts 24 and means for driving shafts through the platform 20 are within the skill of those familiar with the mechanical arts, and therefore, express devices for accomplishing such movement have been omitted from the drawings.

It is also contemplated that the principles of the present invention may utilized where a chemical agent is applied to citrus fruit trees for weakening the stems of the fruit crop. A suitable chemical for this purpose has been described in "Proceedings of Florida State Horticultural Society, 1965," vol. 75, p. 36 wherein the metabolic inhibitor iodo-acetic acid is discussed. Where the stems have been so weakened by chemical treatment, it is usually not necessary to twist the individual fruit from its stem as discussed above, and therefore, the apparatus may be modified to provide a structure which will remove the fruit without twisting the fruit. The modified apparatus may have the general configuration shown for FIGURE 1 wherein a harvesting unit includes a plurality of relatively long spindle shafts with fruit engaging means provided at the ends of the shafts. However, it is not necessary to rotate the individual shafts, and also it is possible to modify the spindle head construction to be no more than a blunt end extension of the individual shafts. The blunt ends would be resilient so as to not harm the fruit crop, and a typical construction would include a rubber or other pliable material extension on the end of each spindle shaft. Of course, it is understood that the novel spindle head configurations discussed for FIGURES 3–7 may also be used with the nonrotating type of spindle shaft unit. With such a modified harvesting unit it is only necessary to approach a fruit tree from an upper surface of the tree and to then move the plurality of spindle shafts downwardly into the tree to push the fruit crop off from its stems. The shafts would be preferably constructed to include the telescoping feature described for FIGURE 3.

Also, the apparatus of the invention may be further modified to include two spaced platforms which can be moved toward and away from each other. An upper platform of the two could carry spindle shafts, and the spindle shafts could pass through the second platform for being rotated by a movement of the platforms toward each other. Such a driving mechanism would include a spiral groove and follower arrangement to translate longitudinal movements of the shafts into rotational movements.

The method of harvesting fruit of this invention includes the steps of contacting individual fruits on at least their upper surfaces for applying gentle downward forces to the same. Further, the method includes the step of applying a twisting motion to each individual fruit to cause a rotation of the fruit about its stem axis. The combined force of twisting the fruit together with the downward pressure which is applied to an upper surface of the fruit results in a gentle removal of fruit from its stem. The method of this invention results in an improved harvesting operation inasmuch as stems are not broken or torn from the tree or the fruit. The method just described is just the opposite of previously attempted methods which require a grappling or pulling of an individual fruit from its stem, resulting in stem damage to the fruit or to the tree itself. It has been found that with the method of this invention, an individual citrus fruit can be cleanly removed from its stem with a gentle pushing force on its upper surface (which is only a fraction of the force required to pull a fruit from its stem) when the fruit is twisted for two to three rotations about its stem axis.

The present invention provides for a substantially improved method and apparatus for selectively harvesting citrus fruit crops to harvest a wide range of sizes of ripe fruit while leaving unripe fruit on the tree. The apparatus is easily constructed from known materials and within cost limitations which can be economically accepted by the present day fruit industry. The apparatus provides for a reliable removal of substantially all of a ripe fruit crop with little or no damage to the fruit or the trees upon which the fruit is growing. The method of the invention provides for a novel operation for removing citrus fruit crops from a tree, and such removal can be accomplished in less time and with less damage to the tree and crop than possible with prior methods.

Obvious variations in the described method and apparatus, and equivalents thereof, are intended to be included within the scope of this invention. Further, the above described invention may be used in combination with other known devices or apparatus for collecting a fruit crop. For example, in removing fruit from the tree, it is the usual practice to let the fruit fall onto the ground for ultimate collection. However it is contemplated that the apparatus described above may include a catching device placed under the tree for preventing the fall of fruit all the way to the ground. Such a device may be in the form of a net or canvas which can be placed above the ground level for receiving removed fruit. Other combinations and variations will become apparent to those skilled in the art.

What is claimed is:

1. Harvesting apparatus for gently removing only ripe citrus fruit from trees while leaving immature crop intact, wherein said apparatus includes a harvesting unit which can be placed above the fruit which is to be harvested for contacting and removing the ripe fruit by engaging and twisting said fruit about its stems while applying a pushing force on its upper surfaces, said harvesting unit comprising:
    a plurality of fruit engaging spindle head means supported by a platform means for movement into and out of a tree, with individual spindle head means being so spaced from one another that a ripe fruit is contacted on its upper surface by more than one spindle head,
    driving means for rotating adjoining fruit engaging spindle heads in a common rotational direction so that a fruit which is contacted therebetween is twisted about the longitudinal axis of its stem, and
    means for moving said plurality of spindle heads downwardly into a tree for contacting and twisting individual fruits between adjoining spindle heads while at the same time applying a gentle pushing force to the upper surfaces of said individual fruits.

2. The apparatus of claim 1 wherein each spindle head means is mounted at the end of a relatively long spindle shaft with a plurality of said spindle shafts being supported in spaced positions in said platform means.

3. The apparatus of claim 2 wherein each spindle shaft includes telescoping sections which compress into one another when a predetermined resistance is met by a spindle head carried at the end of the shaft.

4. The apparatus of claim 2 wherein said spindle shafts are flexible so that individual spindle heads can deflect about tree branches and other obstructions when said plurality of spindle heads is being moved into and out of a tree.

5. The apparatus of claim 1 wherein each spindle head means further comprises:
    a tip portion for guiding said head into a tree and into engagement with ripe fruit,
    a body portion for frictionally contacting the surface of a ripe fruit when said friut is being simultaneously contacted by adjoining spindle head body portions, and
    an upper portion for guiding said head out of a tree after fruit has been removed from the tree.

6. The apparatus of claim 5 wherein each spindle head means is formed from a relatively resilient material which will not damage ripe fruit, and wherein said body portion of the spindle head includes a frictional surface for gripping the surface of a fruit upon contact.

7. The apparatus of claim 5 wherein said upper portion of each spindle head means is relatively smooth so as to permit an easy removal of all spindle heads from a tree.

8. The apparatus of claim 1 wherein each spindle head means is inflatable and deflatable, and including means for inflating each spindle head to a maximum diameter to engage and twist individual fruit when said plurality of spindle heads are within a tree, and means for deflating each spindle head to a minimum diameter for easy movement of the spindle heads into and out of a tree.

9. In an apparatus for harvesting ripe citrus fruit from trees and which includes a harvesting unit for contacting and removing the fruit, the improvement comprising:
    a plurality of friut engaging spindle head means supported by a platform for contacting upper surfaces of ripe fruit and for twisting ripe fruit about its stems, said spindle head means being spaced from one another for a sufficient distance to receive an individual fruit in frictional engagement with more than one of said spindle head means,
    means for placing said platform adjacent a tree for movement downwardly into the tree,
    means for driving said plurality of fruit engaging spindle head means in a common rotational direction so that when an individual fruit is contacted by more than one spindle head, the fruit is twisted about the axis of its stem, and
    means for moving said platform and the spindle heads supported thereon downwardly into and upwardly out of the confines of a tree, said downward movement providing a pushing force on the top surface of fruit within the tree and said upward movement providing for a removal of the spindle heads from the tree after fruit has been removed.

10. The improvement of claim 9 wherein each of said spindle head means is mounted at the free end of a relatively long shaft connected to said driving means and carried by said platform, whereby said plurality of spindle head means can be inserted downwardly into a tree by a movement of said platform, with said shafts depending therefrom, downwardly toward the confines of a tree.

11. The improvement of claim 9 wherein said shafts are extensible and retractable to provide for a movement of said spindle heads relative to said platform, and including means for extending and retracting said shafts to move said spindle heads relative to the platform or to a tree.

12. The improvement of claim 9 wherein each spindle head means further comprises:
    a tip portion for guiding said head into a tree and into engagement with ripe fruit,
    a body portion for frictionally contacting the surface of a ripe fruit when said fruit is being simultaneously contacted by adjoining spindle head body portions, and
    an upper portion for guiding said head out of a tree after fruit has been removed from the tree.

13. The improvement of claim 12 wherein each spindle head means includes a cutting means for cutting the stem of a fruit.

14. The improvement of claim 12 wherein said shafts and spindle heads are arranged in aligned rows in two directions at right angles to each other.

15. The improvement of claim 14 and including means for staggering alternate rows of said spindle heads relative to remaining rows of spindle heads.

16. The improvement of claim 12 wherein said relatively long shafts are sufficiently flexible to permit deflection of individual spindle heads around tree branches and other obstructions and including spacer means carried along said shafts for preventing adjoining spindle heads from contacting each other.

17. The improvement of claim 12 wherein said spindle head means include inflatable body portions which can be inflated to contact fruit and deflated for an easy entry into and removal out of a tree, and further including means for admitting and removing an inflating fluid into and out of individual spindle heads.

References Cited

UNITED STATES PATENTS

| | | | |
|---|---|---|---|
| 3,040,507 | 6/1962 | Lasswell | 56—328 |
| 3,153,311 | 10/1964 | Pool | 56—328 |
| 3,205,644 | 9/1965 | Gordinier | 56—328 |
| 3,222,855 | 12/1965 | Lasswell | 56—328 |
| 3,347,587 | 10/1967 | Frost | 56—328 XR |
| 3,405,515 | 10/1968 | Dittmer | 56—328 |

RUSSELL R. KINSEY, Primary Examiner